2,737,442

PROCESS FOR PRODUCING SODIUM FLUORIDE FROM AN ALKALINE EARTH FLUORIDE

George L. Cunningham, Cleveland Heights, and John M. Finn, Jr., Shaker Heights, Ohio, assignors, by mesne assignments, to The Sinclair Manufacturing Company, H. M. Sinclair, Jr., trustee, Toledo, Ohio, a partnership No Drawing. Application February 21, 1955, Serial No. 489,791

8 Claims. (Cl. 23—88)

This invention relates to a process for producing alkali metal fluorides from an alkaline earth fluoride. More particularly it relates to a process for producing sodium fluoride (NaF) from an alkaline earth fluoride such as fluorspar ($CaF_2$).

In accordance with the process described herein, the preparation of sodium fluoride is effected from relatively inexpensive raw materials, without the use of any mineral acid, without excessive evaporation, and with a minimum amount of liquid in the several steps of the process, whereby an economy of operation hitherto unobtainable is achieved.

The alkali metal fluorides produced in our process are useful in the manufacture of fluxes and welding rods, and in the manufacture of other fluorides, as well as in the fluoridation of water and in the manufacture of rodenticides.

The alkali metal fluorides have been prepared in a wide variety of ways. For example, they have been produced by reacting an alkaline earth fluoride such as fluorspar ($CaF_2$) with sulfuric acid to produce calcium sulfate and hydrofluoric acid. The relatively insoluble calcium sulfate is filtered off, and the hydrofluoric acid is reacted with an alkali metal carbonate such as sodium carbonate to produce an alkali metal fluoride, sodium fluoride, and carbon dioxide. The sulfuric acid used in the process is relatively expensive and corrosive. The hydrofluoric acid produced in the reaction is very corrosive and quite poisonous. The calcium sulfate dihydrate produced in the reaction is formed in relatively small crystals and is difficult to remove from the very corrosive hydrofluoric acid solution. Another process which has been used consists of treating powdered cryolite with a concentrated solution of sodium hydroxide and recovering the sodium fluoride by crystallization from the solution. The cryolite is relatively inexpensive, and the removal of sodium fluoride in high purity from the solution containing sodium aluminate is quite difficult.

Prior art processes like the above suffer from one particularly noticeable disadvantage when employed for the production of sodium fluoride, namely, the relatively limited solubility of sodium fluoride in water, particularly as compared with the solubility of potassium fluoride in water. As a consequence, such prior art processes require very large volumes of water in operational steps in which sodium fluoride is present in solution. By the practice of the instant invention this disadvantage is avoided by carrying out the process so as to first produce potassium fluoride and subsequently converting the readily soluble potassium fluoride to the comparatively insoluble sodium fluoride.

Broadly, our process consists in first preparing a suitable molten salt bath, adding an alkaline earth fluoride thereto, maintaining the molten bath at a suitable temperature to complete the fusion of the constituents and to complete a double decomposition involving the production of a compound of alkaline earth metal with the acid anion of the fusion mixture and the production of potassium fluoride, and then separating the bath into two portions, one of which contains the alkaline earth compound and the other of which contains the newly formed fluoride. Thereafter, the fluoride containing portion is treated to convert it to sodium fluoride. The fluoride obtained from the double decomposition which is effected in the fusion mixture is chosen from those fluorides which have a substantially greater solubility in water than sodium fluoride, so that the recovery of the latter by crystallization and filtration is readily accomplished. The solution separated from the precipitate of sodium fluoride contains the constituents from which the original melt was prepared and these may be recovered and recycled to the first stage of the process, with obvious advantages from the standpoint of economy.

More particularly, our process involves preparing a fused anhydrous bath in which potassium silicate or some other potassium compound is reacted with an alkaline earth fluoride such as fluorspar ($CaF_2$) to form potassium fluoride and an alkaline earth compound such as calcium silicate. The fused salt mixture is maintained molten to substantially complete the reaction and is then added to a minimum amount of water and filtered to remove the alkaline earth silicate. The mother liquor from this operation contains potassium fluoride and some excess potassium silicate, and is practically saturated with respect to potassium fluoride. Solid sodium carbonate or a concentrated solution of sodium carbonate is added to this mother liquor in stoichiometric amounts. That is, one mole of sodium carbonate is added for every two moles of potassium fluoride contained in the mother liquor. Sodium fluoride is relatively insoluble in water, and it is even more insoluble in this solution. Thus solid sodium fluoride is precipitated and is removed by filtration or by other suitable procedures. Yields of the order of 98% are obtained when the various concentrations are adjusted to the correct values.

The liquid recovered from this operation contains potassium carbonate, some potassium silicate, a small amount of sodium fluoride and water. One mole of silica or other suitable oxide is added to the recovered liquid and it is then evaporated to dryness. During the evaporation the potassium carbonate and the added silica react to form potassium silicate and carbon dioxide. By adding the solid residue to the fused bath, the potassium silicate is recovered and the process can be repeated.

In accordance with the above, a fused mixture is formed by melting a potassium compound, for example, potassium silicate, in a suitable vessel. We prefer to prepare the potassium silicate by heating a mixture of potassium carbonate and quartz sand in equimolar proportions until the evolution of gas ($CO_2$) ceases. The resulting product, potassium silicate, constitutes the preferred fusion product for the first stage of our process. However, we have found that suitable salt baths may comprise other compounds than potassium silicate. For example, other satisfactory baths may be formed by heating potassium carbonate with either alumina or ferric oxide to produce potassium aluminate or potassium ferrite. In some instances it may be found to be advantageous to employ mixtures of these potassium compounds as the fused bath.

Once the potassium silicate is prepared in molten form, it is brought to a temperature between 800° and 900° C., say about 850° C. and maintained in that temperature range while an alkaline earth fluoride is added to the melt in the proportion of one mol of the fluoride to each two moles of the potassium silicate. The desired reaction may be effected with $CaF_2$, $MgF_2$, $BaF_2$ or $SrF_2$. In view of the relative scarcity and higher cost of these latter materials in comparison with $CaF_2$, the reaction will be described with reference to fluorspar, in the interest of simplicity, although it will be understood that the other alkaline earth metal fluorides above enumerated may be employed.

The alkaline earth fluoride may be in the form of relatively small particles of crude fluorspar or more advantageously, the form of a powder. The fused mixture is maintained at about 850° C. for about 2 hours during which time the desired double decomposition is effected according to the reaction:

$$(X)K_2SiO_3 + CaF_2 \rightarrow 2KF + (X-1)K_2SiO_3 + CaSiO_3$$

It will be noted that the proportions set forth an excess of $K_2SiO_3$. It has been found that with X equal to about 2, the yields of KF obtained are substantially in excess of those which result when equimolar amounts of $K_2SiO_3$ and $CaF_2$ are employed. Since the excess $K_2SiO_3$ is ultimately recovered and recycled to the fusion mixture, the increase in yield and the shorter reaction time justify the use of an excess as set forth above, from a commercial standpoint.

After a sufficient time has elapsed for any insoluble impurities to settle to the bottom of the otherwise limpid melt, the molten bath is decanted into a measured amount of water in which the potassium fluoride and potassium silicate dissolve. The calcium silicate does not dissolve and forms a solid phase which is easily removed by filtration. The recovered solid calcium silicate is washed with water to remove any soluble material contained therein and the washings are combined with the filtrate which contains the potassium fluoride produced in the fused bath as well as any unreacted or excess potassium silicate. Alternatively the washings may be kept separate and used in making up the quench liquor for the next melt prepared.

The filtrate is next treated to convert the readily soluble potassium fluoride to sodium fluoride which is much less soluble in water. The desired conversion is effected by means of a sodium salt, for example, sodium carbonate, which is added in the amount required to react with the potassium fluoride according to the reaction:

$$2KF + Na_2CO_3 \rightarrow 2NaF + K_2CO_3$$

The potassium silicate previously present in the filtrate remains in the solution. Hence, the reaction is more properly expressed as:

$$2KF + (X-1)K_2SiO_3 + Na_2CO_3 \rightarrow 2NaF + K_2CO_3 + (X-1)K_2SiO_3$$

The above reaction can be carried out at temperatures approaching the boiling point and after the double decomposition has taken place, the solution is permitted to cool whereupon the sodium fluoride crystallizes out from the mother liquor. The reaction may also be effected at room temperature. In both cases, the crystals of sodium fluoride are separated by filtration, washed with cold water and dried. The filtrate consisting of an aqueous solution of potassium carbonate and potassium silicate is evaporated after addition thereto of an oxide such as silica ($SiO_2$) and then recycled to the reaction furnace where it is added to the next batch.

The recovered calcium silicate is in the form of a fine powder which may be dried and used as a filler or pigment in many known compositions. It may be further purified, if desired, by treating it with an acid such as hydrochloric acid to dissolve it. The solution can be filtered to remove the small amount of impurities present and the filtrate evaporated to give a superior grade of pigment or filler.

The advantages of carrying out the process steps in the above described fashion will become more readily apparent from the following examples:

*Example I*

55.2 parts by weight of potassium carbonate were fused with 24.0 parts by weight of quartz ($SiO_2$) sand in a melting furnace maintained at 850° C. When gas bubbles ceased to be evolved from the melt, 15.6 parts by weight of finely divided fluorspar ($CaF_2$) (minus 200 mesh, Tyler Standard) were added to the fused bath. The bath was maintained at about 850° C. for about two hours during which time the calcium fluoride reacted with the potassium silicate to form potassium fluoride (KF) and calcium silicate. The resulting clear melt was quenched in about 195 parts by weight of water and the resulting slurry was ground in a ball mill. The slurry was filtered and the filter cake washed with water. The wash water from this operation was saved to be used in the next cycle as quenching water. The filtrate was composed of approximately 195 parts water and 20.89 parts of potassium fluoride by weight. This represents a 90% yield based on the fluorspar used.

19.06 parts of sodium carbonate by weight was added to this solution and the temperature was raised to about 90° C. It was then cooled to 25° C. and filtered. 11.71 parts by weight of sodium fluoride were obtained.

The mother liquor was evaporated until 130 parts of water by weight have been removed. The resulting slurry was cooled to 25° C. and filtered to remove approximately 2.9 parts of sodium fluoride by weight. The filtrate contained approximately 65 parts water, 0.5 part sodium fluoride and 24.9 parts potassium carbonate by weight. It also contained some excess potassium silicate. The filtrate was evaporated down to dryness and returned to the melting furnace.

The first batch of sodium fluoride and the second batch of sodium fluoride were combined and washed with a minimum of water. Approximately 14.6 parts of sodium fluoride by weight were obtained. This represents a yield of approximately 98% based on the potassium fluoride in the solution. Since the sodium fluoride left in the filtrate was returned to the fusing bath and a substantial part of this will be recovered in the next cycle, it will be seen that our process provides for an excellent recovery of this material.

*Example II*

The procedural steps of Example I were repeated with the quantities halved except that 39 parts by weight of potassium chloride were added to the fusion product resulting from the melting of potassium carbonate and quartz sand. The yield of potassium fluoride obtained from reaction with the alkaline earth fluoride was 100%, based on the recovery of the fluorine. This illustrates one alternative procedure for increasing the overall yield of our process.

*Example III*

The procedure of Example I was repeated except that 41 parts by weight alumina were substituted for the 24 parts by weight of silica in preparing the fused bath. The diluent salt was therefore potassium aluminate instead of potassium silicate and the first recovered solid product was calcium aluminate, instead of calcium silicate. The mixture was fused at the operating temperature of about 975° C.

Approximately 3.0 parts by weight of potassium fluoride was in the extraction solution. This was converted to sodium fluoride by the same procedure given in Example I.

*Example IV*

The procedure of Example I was repeated except that 64 parts by weight of ferric oxide were substituted for 24 parts by weight of silica in preparing the fused bath. The diluent salt was therefore potassium ferrite ($K_2Fe_2O_4$) rather than potassium silicate and the first recovered solid product was calcium ferrite (or its equivalent) instead of calcium silicate. The mixture was not molten even at 1150° C. Approximately 4.8 parts of potassium fluoride by weight was in the extraction liquid. This was converted into sodium fluoride by the procedure given in Example I.

While the above process has described specifically the reaction of potassium silicate with fluorspar, it will be readily appreciated that many variations in the process may be made within the intended scope of our disclosure. For example, instead of using sodium carbonate to react with the potassium fluoride to produce sodium fluoride, other sources of sodium such as sodium hydroxide or sodium silicate may be substituted in this step.

Also, the ratio of silica ($SiO_2$) to potassium oxide may be varied over wide ranges with results which are comparable to those obtained when the equimolar proportions disclosed above are utilized. Since the silica is removed as calcium silicate, in any cyclic operation of our process it is necessary to add only an amount of silica equal to the amount of silica removed as calcium silicate, even though the silica to potassium ratio in the system varies over a range.

In the foregoing examples the separate use of silica, iron oxide and alumina has been disclosed. We have found that they may be used in the form of combinations with one another with equally good results. It should be noted further that the silica, iron oxide and alumina need not be of high purity. Thus, commercial grade ordinary sand has been found to be suitable and commercial grades of relatively low grade alumina and iron oxide may be used, since many of the impurities will be separated in the decantation of the fused bath.

It will be further noted that if sodium silicate is substituted in our process in place of potassium silicate in the fused bath that one step of the process would appear to be rendered unnecessary. This operation has been found to be entirely unsatisfactory due primarily to the relative insolubility of sodium fluoride. This necessitates the use of large amounts of water to extract the sodium fluoride from the fused salt mixture and the resulting solution of sodium fluoride is necessarily quite dilute. To recover the values from such a solution, an excessive amount of heat must be employed in the evaporation process.

Thus, it has been found that a very considerable advantage is obtained by first producing the extremely soluble potassium fluoride in the fused bath and then employing a minimum amount of water to extract it. The resulting solution is of such a concentration that no evaporation is required to obtain high yields of sodium fluoride by the double decomposition disclosed by us utilizing a suitable source of sodium. The reaction of potassium fluoride and sodium carbonate results in approximately 97 to 98% yield based on the fluoride ions available in the original liquor.

The two recovered products in the overall process are sodium fluoride and calcium silicate. Each of these products is washed to remove soluble salts and the soluble salts are returned to the process. In this manner the loss of potassium and other alkali values as well as the loss of sodium fluoride which is sparingly soluble in the wash liquor is reduced to a minimum since these values in each of the liquors is eventually returned to the system.

We claim:

1. A process for producing sodium fluoride comprising: reacting an alkaline earth fluoride with at least one potassium compound of the group consisting of potassium silicate, potassium aluminate and potassium ferrite in a fused bath comprising the potassium compound and the alkaline earth fluoride, separating the alkaline earth compound so formed from the remainder of the melt by quenching the melt in sufficient water to dissolve most of the melt but insufficient to dissolve the alkaline earth compound separating the undissolved alkaline earth compound from the aqueous solution of the remainder of the melt, reacting the aqueous solution of the remaining melt constituents with sodium carbonate to produce sodium fluoride and recovering the sodium fluoride.

2. A process for producing sodium fluoride comprising: reacting an alkaline earth fluoride with potassium silicate in a fused bath comprising the potassium silicate and the alkaline earth fluoride, separating the alkaline earth silicate so formed from the remainder of the melt by quenching the melt in sufficient water to dissolve most of the melt but insufficient to dissolve the alkaline earth compound, separating the undissolved alkaline earth silicate from the aqueous solution of the remainder of the melt, reacting the aqueous solution of the remaining melt constituents with sodium carbonate to produce sodium fluoride and recovering the sodium fluoride.

3. A process for producing sodium fluoride comprising: reacting an oxide of the group consisting of alumina, ferric oxide and silica with potassium carbonate, forming a fused bath comprising the potassium compound so formed and an alkaline earth fluoride, reacting the bath components to form potassium fluoride, separating the alkaline earth compound so formed from the remainder of the melt by quenching the melt in sufficient water to dissolve most of the melt and insufficient to dissolve the alkaline earth compound, separating the undissolved alkaline earth compound from the aqueous solution of the remaining melt constituents, reacting the aqueous solution of the remaining melt constituents with sodium carbonate to produce sodium fluoride and recovering the sodium fluoride.

4. A process for producing sodium fluoride comprising: reacting an alkaline earth fluoride with a potassium compound of the group consisting of potassium silicate, potassium aluminate and potassium ferrite in a fused bath comprising the potassium compound and the alkaline earth fluoride, separating the alkaline earth compound so formed from the remainder of the melt by quenching the melt in sufficient water to dissolve most of the melt but insufficient to dissolve the alkaline earth compound, separating the undissolved alkaline earth compound from the dissolved melt constituents, reacting the aqueous solution of the remaining melt constituents with sodium carbonate to produce sodium fluoride as a finely divided precipitate, filtering the resultant solution and recovering the sodium fluoride.

5. A process for producing sodium fluoride from an alkaline earth fluoride comprising forming a fused bath of at least one potassium compound of the group consisting of potassium silicate, potassium aluminate and potassium ferrite, introducing alkaline earth fluoride into the bath, maintaining the fused bath mixture at an elevated temperature to form potassium fluoride and an alkaline earth compound of the group consisting of alkaline earth silicates, alkaline earth aluminates and alkaline earth ferrites, separating the alkaline earth compound so formed from the remainder of the melt by decanting the melt into a measured amount of water sufficient to dissolve the remainder of the melt, but insufficient to dissolve the alkaline earth compound and filtering the resulting mixture, reacting the filtrate containing the dissolved melt constituent with a sodium compound to produce sodium fluoride, separating the sodium fluoride from the solution, evaporating the solution to dryness and returning the dried residue to the molten pool of fused material for reuse in a repetition of the process.

6. A process for producing sodium fluoride comprising: reacting a mixture of fluorspar and potassium silicate at temperatures at which the mixture is molten, quenching the molten mixture in a measured amount of water sufficient to dissolve the alkali metal constituents but insufficient to dissolve the calcium silicate, removing the calcium silicate by filtration, adding sodium carbonate to the filtrate to produce sodium fluoride and recovering the sodium fluoride.

7. A process for producing sodium fluoride from an alkaline earth fluoride comprising: forming a fused bath composed of an alkaline earth fluoride, potassium chloride and at least one other potassium compound selected from the group consisting of potassium silicate, potassium aluminate and potassium ferrite, maintaining the bath at an elevated temperature to react the alkaline earth fluoride with the potassium compound to produce potassium fluoride and an alkaline earth compound, separating the alkaline earth compound from the more soluble alkali metal compounds of the fused bath by contacting the melt with an amount of water sufficient to dissolve the alkali metal compounds but insufficient to dissolve the alkaline earth compound and filtering the resultant mixture, reacting the filtrate with a sodium compound to produce sodium fluoride and recovering the sodium fluoride.

8. A process for producing sodium fluoride from an alkaline earth fluoride comprising forming a fused bath of at least one potassium compound of the group consisting of potassium silicate, potassium aluminate and potassium ferrite, introducing alkaline earth fluoride into the bath, maintaining the fused bath mixture at an elevated temperature to form potassium fluoride and an alkaline earth compound of the group consisting of alkaline earth silicates, alkaline earth aluminates and alkaline earth ferrites, separating the alkaline earth compound so formed from the remainder of the melt by decanting the melt into a measured amount of water sufficient to dissolve the remainder of the melt, but insufficient to dissolve the alkaline earth compound and filtering the resulting mixture, reacting the filtrate containing the dissolved melt constituent with a sodium compound to produce sodium fluoride, separating the sodium fluoride from the solution, evaporating the solution to dryness and employing the dried residue as the potassium supplying constituent from which a molten pool of fused material is employed in a repetition of the process.

References Cited in the file of this patent

UNITED STATES PATENTS

| | | |
|---|---|---|
| 969,381 | Loesekann | Sept. 6, 1910 |
| 1,388,276 | McKerahan | Aug. 23, 1923 |
| 1,581,819 | Siegel | Apr. 20, 1926 |
| 1,699,234 | Gaus et al. | Jan. 15, 1929 |